United States Patent [19]

Bell, III et al.

[11] 4,003,199
[45] Jan. 18, 1977

[54] TURBINE ENGINE WITH AIR BRAKE

[75] Inventors: Albert H. Bell, III, Birmingham, Mich.; Hans Egli, Santa Monica, Calif.

[73] Assignee: General Motors Corporation, Detroit, Mich.

[22] Filed: Mar. 1, 1976

[21] Appl. No.: 662,611

[52] U.S. Cl. .......................... 60/39.16 R; 415/163
[51] Int. Cl.² ...................... F02C 3/10; F02C 7/02
[58] Field of Search ............ 60/39.16 R; 192/3 TR; 188/270, 290, 296; 415/163, 164; 416/183

[56] References Cited

UNITED STATES PATENTS

| | | | |
|---|---|---|---|
| 3,203,177 | 8/1965 | Johnson | 60/39.16 R |
| 3,314,597 | 4/1967 | Schibbye | 418/203 |
| 3,424,373 | 1/1969 | Gardner | 418/201 |
| 3,432,089 | 3/1969 | Schibbye | 418/201 |
| 3,533,493 | 10/1970 | Braun | 60/39.16 R |
| 3,678,285 | 7/1972 | Griffith | 60/39.16 R |
| 3,738,780 | 6/1973 | Edstrom | 418/201 |
| 3,762,161 | 10/1973 | Pennig | 60/39.16 S |
| 3,817,343 | 6/1974 | Albrecht | 188/2 R |
| 3,869,227 | 3/1975 | Kocher et al. | 418/201 |
| 3,877,846 | 4/1975 | Lundberg | 418/201 |

FOREIGN PATENTS OR APPLICATIONS

| | | | |
|---|---|---|---|
| 1,118,800 | 12/1961 | Germany | 418/201 |
| 701,505 | 12/1953 | United Kingdom | 418/163 |

*Primary Examiner*—Carlton R. Croyle
*Assistant Examiner*—L. J. Casaregola
*Attorney, Agent, or Firm*—J. C. Evans

[57] ABSTRACT

A device to produce vehicle braking from a two-shaft gas turbine engine including an air brake with a centrifugal impeller on the power turbine shaft, the impeller having blades forwardly turned at the impeller exit through an angle greater than sixty degrees for absorbing energy from the power turbine shaft thereby to control power transfer to an output shaft. The system includes a variable inlet control assembly to throttle inlet air flow to the air brake impeller so as to regulate the amount of power absorption from the power turbine shaft.

4 Claims, 5 Drawing Figures

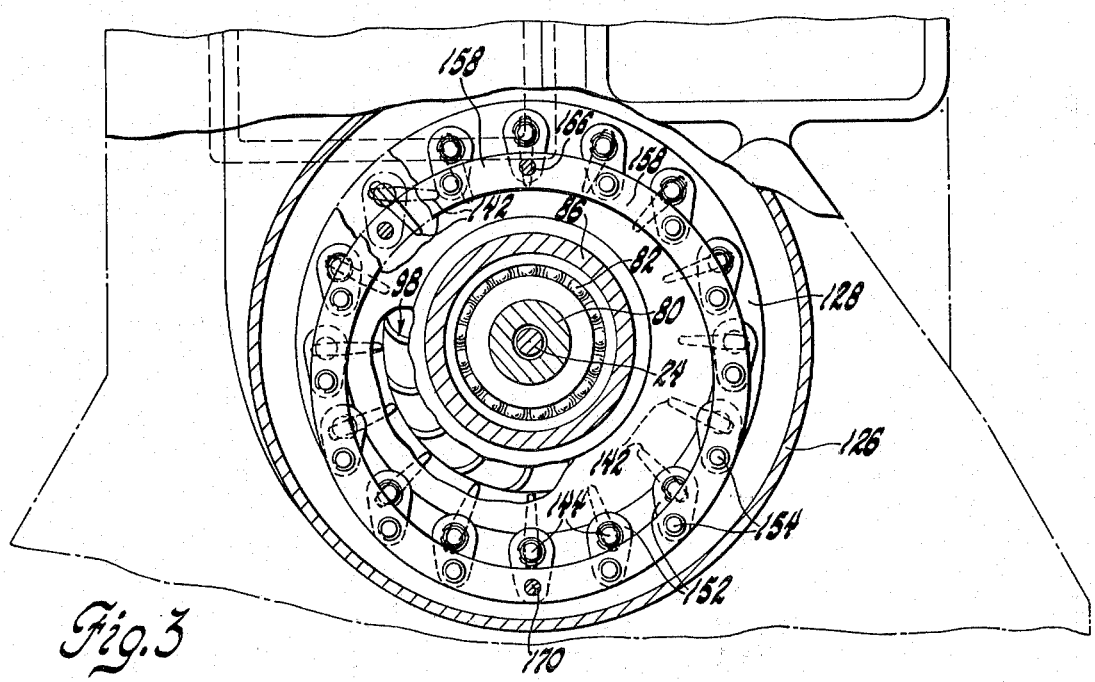
Fig. 3
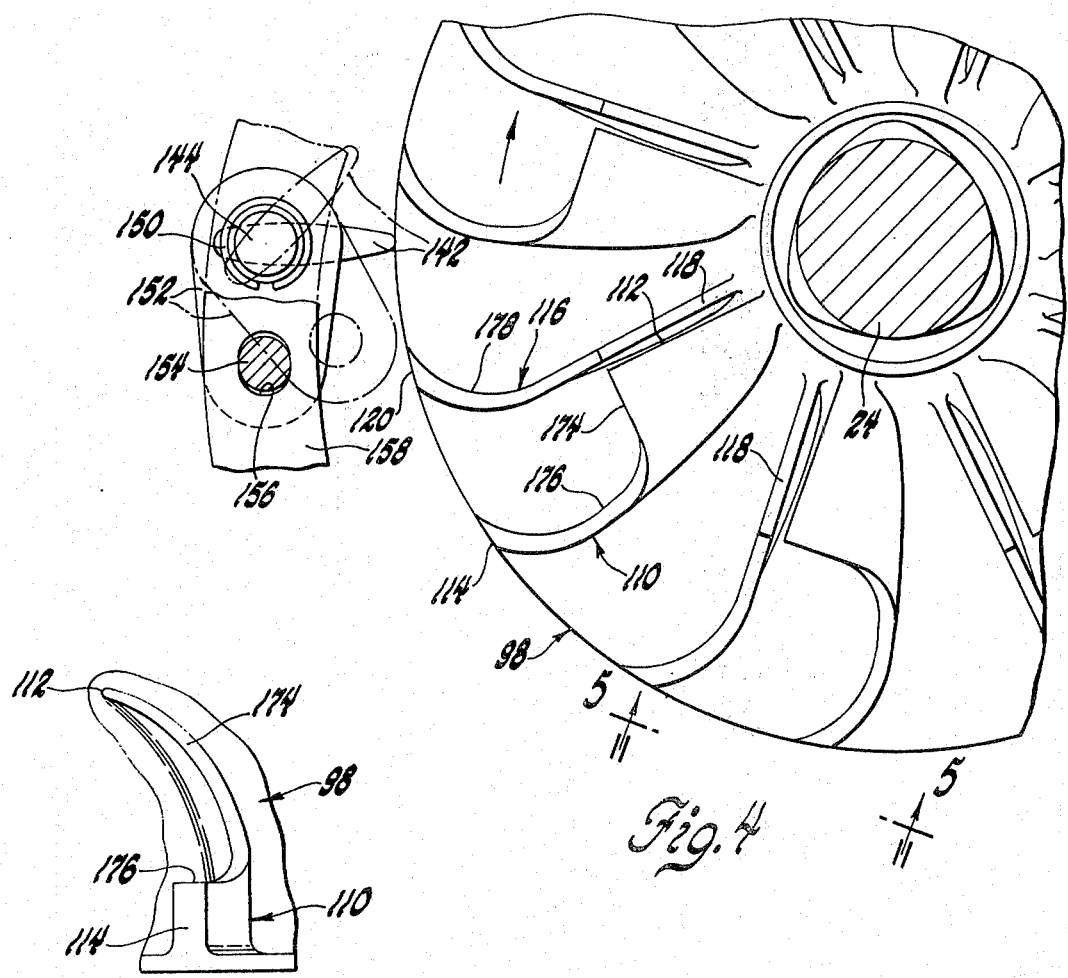
Fig. 4
Fig. 5

TURBINE ENGINE WITH AIR BRAKE

This invention relates to gas turbine engines for powering automotive vehicles and more particularly to a two-shaft gas turbine engine having an associated power absorption system for vehicle braking.

Two-shaft gas turbine engines have been proposed for use on automobile and other vehicles. One problem is that a gas turbine engine of this type will have a substantial inertia and will have reduced internal braking as compared to existing piston engines that are used to power passenger car vehicles.

The use of an air brake system on the output power shaft of a two-shaft gas turbine engine has been proposed. One approach is set forth in U.S. Pat. No. 3,678,285 issued July 18, 1972, to Griffith. It discloses a centrifugal impeller connected to the output shaft of an aircraft power unit to regulate the power transfer to a driven unit.

Another approach for braking a motor vehicle driven by a gas turbine engine of a two-shaft type having a free working output power turbine shaft is set forth in U.S. Pat. No. 3,817,343 issued June 18, 1974, to Albrecht. In this arrangement, the output or free turbine of a two-shaft gas turbine engine for a motor vehicle has a rotary compressor arranged in the force transmission or power path from the free working turbine output shaft to the driven wheels. A throttle is installed in the inlet to the compressor to control the amount of power absorption.

However, in actual use it has been found that many compressor configurations are unsuited for a brake absorption since many rotary compressors, while having an adequate horsepower loss under braking conditions, retain a substantial horsepower loss under normal running conditions. For example, in the case of axial compressors it is observed that in order to obtain braking horsepower in the range of 36 horsepower that a minimum horsepower loss under run operation will be in the order of 12 horsepower. This represents a turn-down ratio from an elevated braking horsepower that will act on the drive wheels of a vehicle to produce engine braking corresponding to that normally present in an internal combustion engine to a parasitic loss horsepower level under normal run operations in the order of three. Such turn-down ratios are unsuitable for most motor vehicle operations since the parasitic horsepower loss imposed on the power train under normal operating conditions is maintained at a level which will seriously affect fuel economy and performance. Furthermore, U.S. Pat. No. 3,817,343 suggests that the inlet to the rotary compressor, which is stated to be of any conventional construction, should be completely closed under normal operating conditions. In such cases, it is necessary to provide some means for cooling the impeller of the air brake in order to prevent excessive heat build-up in the brake device.

Accordingly, an object of the present invention is to improve two-shaft type gas turbine engines for use in automotive vehicles by providing means therein to produce internal braking of the output shaft that is comparable to that found in piston-type internal combustion engines and to do so by means of an air brake in the form of a centrifugal impeller coupled to the turbine output power shaft, the impeller having blades forwardly turned through an angle in excess of sixty degrees at the exit of the impeller and with inlet air to the impeller being controlled by variable geometry inlet throttling vanes to regulate air flow at run and brake positions, with the impeller operating smoothly and continuously over the entire speed and power absorption range when the vanes are opened to a brake and run position; and when the vanes are in a run position, the impeller absorbing minimum power to produce a ratio of power absorbed during braking at a given speed to the minimum power absorbed during run operation at the given speed in excess of eight.

Still another object of the present invention is to provide an improved two-shaft gas turbine engine for a vehicle by including a centrifugal impeller on one end of the power turbine shaft of a two-shaft gas turbine engine and to locate the impeller within an inboard cavity of a rear bulkhead of the engine and including inlet flow control means to vary the mass flow through the impeller so that the compressor will absorb less energy under normal driving conditions and will absorb increased energy under braking conditions and wherein the impeller has blades thereon each of which is forwardly turned at the exit of the impeller through an angle in excess of 60° and wherein the inlet air of the impeller is controlled by throttling vanes of the inlet flow control means to regulate air flow through the impeller at run and brake positions so as to cause the impeller to operate smoothly and continuously over the entire speed and power absorption range of the air brake when the vanes are open in a brake position and partially closed in a run position; and to further improve such an engine by having the vanes operative when in a run position to cause the impeller to absorb minimum power to produce a ratio of power absorption during braking at a given speed to a minimum power absorption under run operation at the given speed which is in excess of eight to produce a minimum parasitic loss on the vehicle drive train during normal vehicle operations.

Further objects and advantages of the present invention will be apparent from the following description, reference being had to the accompanying drawings wherein a preferred embodiment of the present invention is clearly shown.

IN THE DRAWINGS

FIG. 3 is a vertical sectional view taken along the line 3—3 of FIG. 2 partially broken away;

FIG. 4 is an enlarged fragmentary end elevational view showing the relationship of the centrifugal impeller of the present invention in association with inlet control vane components thereof; and FIG. 5 is an elevational view taken along the line 5—5 of FIG. 4 looking in the direction of the arrows.

Figure 1:
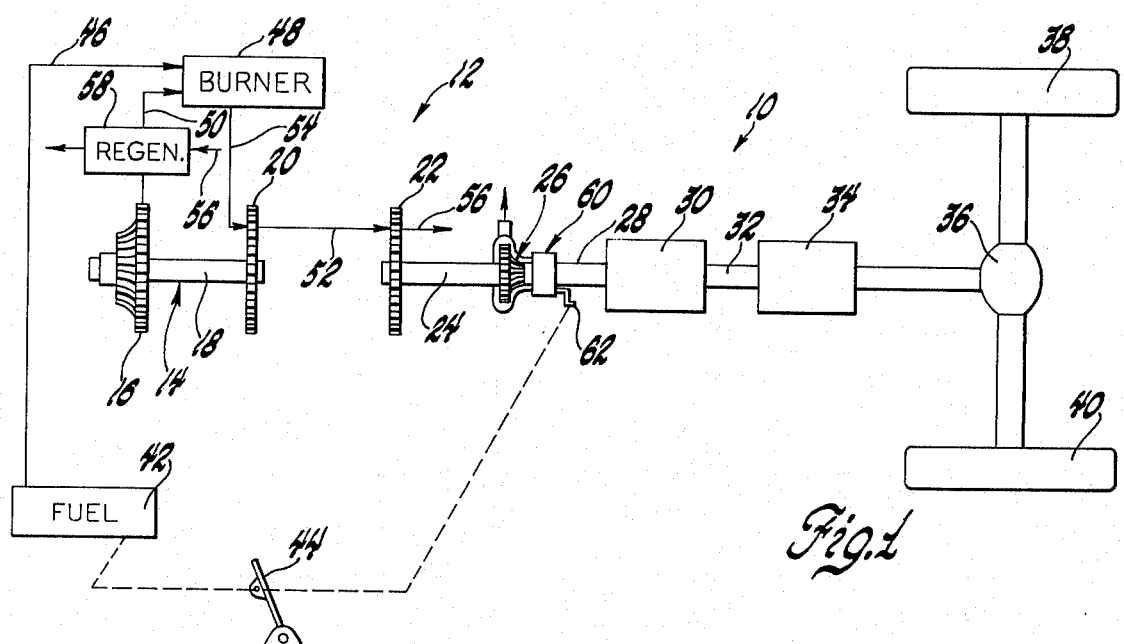
FIG. 1 is a diagrammatic view of a two-shaft gas type turbine engine including the air brake system of the present invention.

Referring now to FIG. 1, a motor vehicle 10 is illustrated in diagrammatic form including a two-shaft gas turbine engine 12 for powering the vehicle. The two-shaft gas turbine engine 12 includes a gasifier spool 14 having a compressor 16 connected by a gasifier shaft 18 to a gasifier turbine 20. The engine 12 further includes a power turbine 22 connected to a free-wheeling power turbine output shaft 24 that is coupled to an air brake assembly 26 in accordance with the present invention, thence through an output shaft 28 and gear reduction unit 30 to a vehicle drive shaft 32 coupled to the input of a transmission 34 thence through a differential and rear axle assembly 36 to the drive wheels 38, 40 of the vehicle.

A fuel control 42 for the vehicle is under the control of an accelerator pedal 44. It supplies fuel through a conduit 46 to the burner 48 of the engine 12. The burner 48 also receives an air supply from a conduit 50 connected to the outlet of the gasifier compressor 16. Combustion products from the burner 48 are directed through outlet 52, 54 for driving the power turbine 22 and the gasifier 20. In the illustrated arrangement the exhaust from the turbines 20, 22 is directed through a conduit 56 to a regenerator 58 for heating air from the gasifier compressor 16 prior to passage into burner 48.

The air brake system 26 includes a variable geometry inlet controller 60 having a control input crank arm 62 coupled to the accelerator or throttle pedal 44 to control the operation of the air brake assembly 26 in accordance with accelerator position.

A representative form of fuel control operating in response to accelerator pedal position is set forth in U.S. Pat. No. 3,851,464 issued Dec. 3, 1974, to Davis et al. For purposes of the present invention it should be understood that a greater fuel supply is directed to the burner 48 during acceleration and a lesser fuel supply is directed thereto during deceleration. However, in motor vehicles driven by gas turbine engines such as the two-shaft engine turbine 12 shown in FIG. 1, it is recognized that there is limited engine braking produced when the pedal 44 is moved to a decelerated position. The purpose of the improved air brake assembly 26 in FIG. 1 is to produce an engine braking of the vehicle 10 in the order of 36 horsepower at 32,000 rpm shaft speed of the output shaft 24. This is produced by the operation of the crank arm 62 by the accelerator pedal 44 as it moves to a deceleration position. Under normal vehicle operation, the crank arm 62 will condition the inlet controller 60 to reduce the amount of air flow through the air brake assembly 26 so that power absorption therefrom will be in the order of one-eighth to one-tenth of the power absorbed under braking conditions when the crank arm 62 conditions the controller 60 in a run position to cause increased mass air flow through the air brake assembly 26.

To be effective in an automotive vehicle application it is desired that the air brake assembly 26 function under vehicle deceleration or brake operation of the air brake assembly 26 to produce a braking characteristic or power absorption on the power turbine shaft 24 which is similar to the braking produced by a relatively large V-8 engine driving a typical automobile through an automatic transmission.

Figure 2:
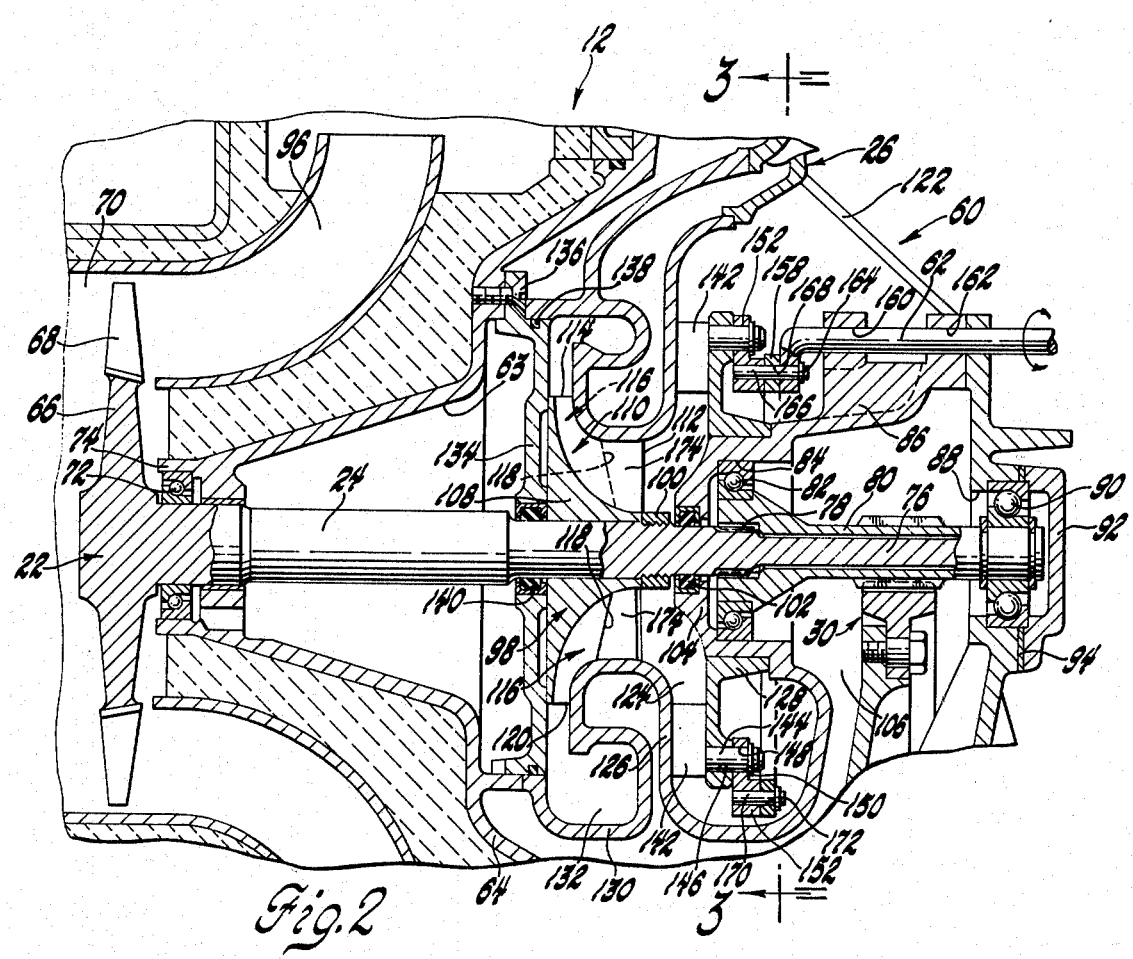
FIG. 2 is an enlarged fragmentary longitudinal section view of the power turbine of FIG. 1 including a centrifugal impeller with blades highly forwardly turned at the exit of the impeller to produce a turn-down ratio from braking operation to normal run operation of eight-to-one to ten-to-one.

In accordance with certain principles of the present invention the air brake assembly 26 is configured to fit within an inboard, concave opening 63 formed in a rear bulkhead 64 of the engine 12. As seen in FIG. 2, the power turbine 22 includes an impeller wheel 66 having a ring of axial flow blades 68 on its outer periphery located in an exhaust passage 70 through which exhaust gas from the conduit 52 is directed from the combustor 48. The output shaft 24 extends from the impeller wheel 66 concentrically through the opening 63. The output shaft 24 is supported at the inboard end thereof by a bearing 72 in a bulkhead extension 74.

Shaft 24 further includes an extension 76 thereon having a splined connection at 78 with one end of a gear shaft 80 that is the input to the gear reduction unit 30. In the representatively shown power transfer in FIG. 2, the gear shaft 80 is rotatably supported by a bearing 82 at one end thereof carried within a bore 84 of a bearing housing 86. An outboard bore 88 of the housing 86 supportingly receives a second bearing 90 that rotatably supports the outboard end of the gear shaft 80. A cover plate 92 is sealed to the bearing housing by means of a gasket 94 and is removable for replacement of the bearing 90.

As combustion products from the burner 48 are directed through passage 70 they drive the power turbine 22 to cause rotation of the shaft 24. Combustion products from the blades 68 are directed through an annular exhaust passage 96 and are thence returned through duct or conduit 56 to the regenerator 58 for heating compressed air from the gasifier compressor 16 to raise the temperature thereof prior to entrance into the burner 48. Combustion products are exhausted from the regenerator 58 to atmosphere.

In two-shaft type gas turbine engines, power turbine shaft speeds under vehicle deceleration or braking conditions may not produce desired engine braking of the vehicle 10. Hence the turbine engine 10 has a built-in air brake assembly 26 that produces internal braking comparable to that found in a piston engine.

Typical proposed design requirements are that at a mechanical speed of 32,000 rpm corresponding to 70 MPH vehicle speed, the air brake assembly 26 should be capable of absorbing 36 horsepower under a brake mode. At the same mechanical speed, under normal driving conditions under a run mode, the parasitic power loss of the air brake should be in the range of one-tenth of the brake power absorption during the brake mode.

More particularly, the brake assembly 26 includes a compressor impeller wheel 98 mounted on the power turbine shaft 24 forwardly of the bearing 82. In the preferred embodiment, the compressor wheel 98 is in the form of a centrifugal impeller. Its centrifugal head aids through flow pumping during brake operation and produces high specific work.

The compressor impeller wheel 98 is secured on the shaft extension 76 by a retainer element 100. A seal element 102 on a flanged end 104 of the bearing housing 86 seals the shaft extension 76 with respect to a gear case cavity 106.

The compressor wheel 98 has a hub 108 with a plurality of blades 110 thereon. Each blade 110 has an axial inlet end 112 and a radial outlet end 114. Each blade is configured, as will be discussed, to produce high specific work on mass air flow therethrough. A flow splitter 116 is located between each pair of blades. Each splitter 116 has an axial inlet end 118 and a radial outlet end 120.

An inlet to the compressor wheel 98 is defined by an opening 122 on the end of the turbine engine 12, as shown in FIG. 2. It directs air across the variable geometry inlet controller 60 radially inwardly through a radially extending annular passage 124 formed by a compressor housing 126 and a controller support ring 128. The backside of a scroll 130 that forms a discharge passage 132 from the compressor wheel 98 is closed by a plate 134 secured by means of screws 136 at circumferentially spaced points along the outer periphery thereof to the bearing housing 64. The plate 134 includes an annular seal 138 therein which seals the backside of the compressor cavity for the compressor wheel 98. A shaft seal 140 is supported by plate 134 to seal the inboard side of shaft extension 76.

For purposes of the present invention, it should be understood that the variable geometry inlet controller 60 is merely representative of one suitable arrangement for meeting the objectives of the present invention in that it has an open "brake" position wherein a substantial mass air flow is directed through the compressor impeller wheel 98 under conditions where the vehicle accelerator pedal 44 is moved to decelerate the vehicle. Furthermore, the controller 60 includes a "run" position wherein a reduced mass flow of air is directed through the compressor for cooling the compressor during normal vehicle operation and to reduce the power absorption therefrom under normal vehicle operation where the accelerator pedal 44 is positioned to maintain vehicle speed.

The amount of engine braking or power absorption produced by the air brake system during both the brake and run positions of the controller 60 should establish a turn-down ratio which for purposes of the present invention represents the ratio of the power absorption or brake horsepower loss, produced when the control vanes 142 are in an open position, to the parasitic or minimized brake horsepower loss which is produced when the vanes 142 are moved to a throttling position to reduce the mass flow of inlet air through the passage 126. In accordance with the present invention, the compressor blades 110 and flow splitters 116 are carefully configured to produce a power turn-down ratio in the order of eight-to-one to ten-to-one.

The representatively shown controller 60 more specifically includes a plurality of control vanes 142 located within the passage 124. Each of the vanes 142 has a shaft 144 thereon directed through a bore 146 in the outer periphery of the support ring 128. Each of the shafts 144 further is directed through a bore 148 where it is retained by snap ring 150 at one end of a control lever 152 that has a pin 154 pivotally supported on the opposite end thereof. Each pin 154 is directed through a slightly elongated slot 156 in a control ring 158, in FIG. 4, that is eccentrically supported with respect to the centerline of the drive shaft 24 as best seen in FIG. 3. The control ring 158 is connected to the crank arm control input 62. It is directed through spaced apart bores 160, 162 in the upper side of the bearing housing 86. The crank arm 62 is secured by means of a retainer 164 on one end of an elongated pin 166 that is directed through a circular pilot bore 168 in ring 158.

In addition to being piloted at the crank arm 62, the control ring 158 is also piloted at a lower pin 170 located diametrically of pin 166. Pin 170 is directed through a circular bore 172 in the ring 158 so that rotation of the crank arm 62 will produce a piloted shifting movement of the ring 158 about its centerline. This will cause each of the pins 154 that are directed through the elongated slots 156 in the ring 158 to be carried through a path on the outer circumference of the ring 158 to produce a resultant rotation of each of the vanes 142 so as to produce a greater or lesser radial communication from exteriorly of each of the vanes 142 radially inwardly through the passage 124.

As best seen in FIGS. 3 and 4, when the ring 158 is acted upon by the crank arm 62 upon deceleration movement of pedal 44, it will shift the pins 166, 170 in an arcuate path on either side of the centered position shown in FIG. 3. When the control ring 158 is centered as shown in FIG. 3, each of the vanes 142 will be directed radially inwardly through the centerline of the shaft 24 which is the center of the axial inlet to the compressor impeller 98. This is the brake position of controller. At this position there is relatively unrestricted flow of air into the impeller wheel 98 and it will therefore induce a substantial mass flow of air therethrough and at the same time will absorb at a given power turbine speed for engine braking of the vehicle 10.

When the crank 62 is moved to a throttle position, upon acceleration and normal run movement of pedal 44, the ring 158 shifts each of the pins 154 through an arcuate, adjustment path on the outer circumference of the ring 158, as best seen in FIG. 4, to cause each of the vanes 142 to assume the dotted line position in FIG. 4. This throttles inlet air flow into the inlet of the impeller wheel 98 and thereby reduces the amount of mass flow of air through the compressor and results in reduction in the power absorption by air brake assembly 26. The maximum throttling position and reduced power absorption is represented by a maximum allowable parasitic loss that is produced during gas turbine engine operation under normal vehicle cruise and acceleration operation.

The invention is premised on controlling brake action of the compressor impeller wheel 98 by regulating the amount of mass flow therethrough. In the illustrated embodiment, inlet prewhirl and throttling are produced by the variable geometry inlet controller 60.

As shown in FIG. 5, in order to obtain a braking action on the power turbine shaft which will produce the desired engine braking effect under deceleration conditions, when the accelerator pedal is released, it is necessary to have a compressor impeller that operates without surge during the run mode and with high specific work during the brake mode. It is clear that any number of impeller devices can be configured to produce work on air flow therethrough to produce a shaft power horsepower brake range during deceleration as long as the impeller has a substantial enough external diameter and a number of blades thereon to produce effective work on air flow thereacross. However, in order for present invention to be feasible, it is also necessary to consider the diameter of the impeller and the specific blade configuration. It is, first of all, necessary to maintain a reduced impeller diameter in order that the air brake system will fit into a cavity such as opening 63 in rear bulkhead 64 at the aft end and within limited confines at the rear of a standard two-shaft gas turbine engine for a vehicle.

Moreover, the compressor must not only have a capacity to produce a substantial amount of work and resultant power absorption an air flow therethrough during the brake mode, it must also be configured to have stable operation and minimized power absorption under normal operating, run mode conditions so as to minimize parasitic losses on the power shaft 24 so that engine power will be available to propel the vehicle through the transmission and drive wheels of the vehicle.

Investigation has shown that standard axial and centrifugal compressor wheels of the type having straight radial blades thereon, while suitable for producing shaft horsepower absorption under brake conditions, also have a substantial braking effect under normal operating conditions even though the inlet mass flow therethrough is throttled.

In accordance with the present invention it is necessary to maintain a minimum air flow through the impeller to cool the cavity in which the air brake compressor impeller wheel 98 is rotating.

It has been observed that such minimum air flow through standard axial and centrifugal compressors will result in a parasitic loss of power absorption, even though the air flow is throttled to the minimum air flow level, in the order of one-third of the horsepower loss under brake conditions.

For example, under operating conditions where the vehicle is driven at 70 MPH and the turbine power shaft is operating at 32,000 rpm such conventional impellers may be designed to produce a 36 horsepower brake power absorption. However, such conventional impellers will produce a parasitic brake action approximately one-third of the 36 horsepower brake level. Such parasitic losses, in the 60 to 70 mile vehicle speed range represent a substantial loss in drive horsepower which can substantially reduce fuel economy.

In accordance with the present invention, however, and as shown in FIGS. 4, 5, the centrifugal impeller wheel 98 has blades 110, 116, highly forwardly turned at the impeller exit. The term "forward turned" means a blade curvature turned in the direction of impeller rotation. With such a compressor blade configuration, brake mode of operation, as the accelerator is released, in the 60 to 70 MPH vehicle speed range, brake horsepowers in the order of 30 to 36 horsepower are produced which correspond to the deceleration braking action of a piston type internal combustion engine. However, and most importantly, during normal run mode operation, where minimal air flow is directed across an impeller with highly forwardly turned vanes, as shown in FIGS. 4 and 5, the parasitic horsepower losses are maintained in the range of three to three and one-half horsepower representing a turn-down ratio in the order of eight-ten. Such parasitic losses are acceptable from a fuel economy standpoint.

Referring now to FIGS. 4 and 5, the blades 110, 116 on the compressor impeller wheel 98 in FIG. 2 are more detailedly set forth to illustrate the configuration to obtain desired work capacity under open throttle position of the controller 60 and the desired turn down ratio in the order of eight-ten when the controller 60 is throttling air flow to the compressor impeller wheel 98. In one working embodiment the impeller has an exit radius of 2.1 inches. Sixteen blades are equally spaced circumferentially around the impeller hub. Each alternate blade is a flow blade 110. Each blade 110 includes an inlet end 112 with a substantial blade height to coact with the vanes 142 of the controller 60 under normal operating conditions to receive inlet air flow at a desired attack angle. Each of the blades 110 extends from the inlet end 112 as an inducer segment 174 that leads to a portion 176 on the blade that is highly forwardly turned by being bent from the inducer segment 174 in the direction of rotation of the compressor impeller wheel through an angle of approximately 65° at the exit end 114 of the blade 110.

Additionally, the compressor impeller wheel 98 includes a plurality of splitter blades 116 that are located intermediate each of the blades 110. The splitter blades each have an inlet end 118 located intermediate each of the adjacent blades 110 at a point axially rearwardly of the entrance to impeller 98. The inlet end 118 leads to a blade segment 178 turned like the blade portions 176 through a highly forwardly turned angle, and with the blade segments 178 each having an exit end 120 corresponding to the previously mentioned exit ends on the blades 110.

The aforedescribed compressor impeller wheel 98 with blades highly forwardly turned at the impeller exit will produce high specific work on mass air flow passing through the compressor impeller wheel 98 and when the controller 60 is positioned in its brake mode will produce the aforedescribed desired power absorption to brake the vehicle under deceleration operation. However, under reduced air flow conditions through impeller wheel 98 which occur when the controller blades 142 are moved into a negative attack relationship with the inlet ends of the impeller blades 110, 116 to throttle mass flow to the compressor impeller wheel 98, parasitic losses are minimized. The location of the controller 60 closely upstream of the inlet to the specifically formed compressor impeller wheel 98 and the forwardly turned vanes combine to reduce surge as minimum air flow is directed therethrough.

Representative examples of the air flow through the compressor impeller wheel 120 at braking and normal operating conditions at a wheel speed of 32,000 rpm, have shown that there is aerodynamic stability down to air flows in the order of 0.06 pounds per second which is considered to be a desired representative minimum figure for cooling. At 32,000 rpm a compressor impeller wheel 98 of the aforedescribed configuration is capable of generating air flow of the order of 0.8 pounds per second under unrestricted flow conditions when the controller 60 is in its open position with the vanes 142 directed radially inwardly as shown at solid line positions in FIGS. 3 and 4.

By way of summary, the present invention including novel compressor impeller wheel 98 and the controller 60 with variable inlet vane positions for directing air to the leading edges of highly forwardly turned blades and operative to throttle air flow thereto takes the form of a device easily added on the aft end of the power turbine shaft of a vehicle gas turbine engine. It has been observed that an air brake assembly of the type set forth above closely simulates the braking action of a standard piston engine when the piston engine vehicle accelerator is released.

By virtue of the above arrangement, the compressor impeller wheel 98 is opened up for braking and is essentially closed off but for cooling air flow for minimum power absorption during vehicle cruise operation. The preferred centrifugal compressor with high forwardly turned blades produces a desirable power turndown ratio, i.e., the ratio of braking power to parasitic cruise power, to avoid excessive fuel consumption penalty due to the air brake under vehicle cruise conditions. The ideal braking characteristics are specified to duplicate the braking characteristics of a 1973 Buick 455 cubic inch displacement engine. The shaft power of a typical air compressor brake varies approximately as the cube of the shaft speed. This compressor is configured to superimpose the power absorption therefrom to that of an existing reciprocating type internal combustion engine.

While the embodiments of the present invention, as herein disclosed, constitute a preferred form, it is to be understood that other forms might be adopted.

The embodiments of the invention in which an exclusive property or privilege is claimed are defined as follows:

1. In a two-shaft gas turbine engine of the type including a gasifier compressor coupled on one end of a first shaft having a gasifier turbine on the opposite end thereof and a power turbine connected to a second shaft having means thereon for transferring power from the power turbine shaft to a vehicle transmission and wherein the gasifier compressor supplies compressed air to a burner assembly which discharges combustion products through the gasifier turbine and the power turbine, the improvement comprising: a rear bulkhead on the engine having a concave opening extending axially inboard of said engine, a portion of the power shaft extending axially through said opening, an air brake compressor mounted directly on the power turbine shaft within said opening, said air brake compressor having an inlet and an outlet, said compressor including an impeller having a hub with a radially outwardly curved surface extending from said inlet to outlet, a plurality of blades on said impeller secured to said curved surface, each of said blades having an inducer portion for directing flow from said inlet into said impeller, each of said blades having a segment downstream of and curved continuously from said inducer portion forwardly in the direction of impeller rotation and extending to the outlet, said downstream segment having a forward curvature at the outer periphery of said impeller in excess of 60° from a plane through the center of the impeller, inlet guide vanes in the inlet to said air brake compressor to control mass air flow to the compressor, said vanes having an open brake position and a partially closed run position, said vanes throttling the inlet air flow to the air compressor in the run position to cause limited air flow through the air brake compressor to maintain cooling thereof during run operation and reduced parasitic power losses, said vanes guiding greater mass air flow to said blades at said brake position and said downstream segments of said blades to produce a high level of specific work on said greater mass air flow to produce a ratio of brake power loss when the vanes are in a brake position to parasitic power loss when the vanes are in a run position not less than eight-to-one.

2. In a two-shaft gas turbine engine of the type including a gasifier compressor coupled on one end of a shaft having a gasifier turbine on the opposite end thereof and a power turbine connected to a second shaft having means thereon for transferring power from the power turbine shaft to a vehicle transmission and wherein the gasifier compressor supplies compressed air to a combustor assembly having a throttle controlled fuel supply, and wherein the combustion products from the combustor assembly pass through the gasifier turbine and the power turbine for driving a power transmission of a motor vehicle, the improvement comprising: a rear bulkhead on the engine having a concave chamber extending axially inboard of said engine, a portion of the power shaft extending axially through said chamber, an air brake compressor mounted directly on the power turbine shaft, said air brake compressor having an inlet and an outlet, said air brake including an impeller with a hub having an axial inlet and a radially outwardly curved surface extending from said inlet to the radially outer periphery of said impeller, a plurality of blades on said impeller each secured to said curved surface, each of said blades having an inducer portion for directing flow from said compressor inlet into said impeller, each of said blades having a segment downstream of said inducer portion curved continuously from said inducer portion forwardly in the direction of impeller rotation and extending to the outer periphery of said impeller, said downstream segment having a forward curvature at the outer periphery of said impeller in excess of sixty degrees from a plane through the center of the impeller, inlet guide vanes in the inlet to said air brake compressor to control inlet mass air flow to the compressor, said vanes having an open brake position and a partially closed run position, means for positioning said vanes in the open brake position in response to deceleration movement of the throttle and in the partially closed run position in response to acceleration and vehicle speed maintenance positions of the throttle, said vanes throttling the inlet air flow to the air brake compressor in the run position to cause limited air flow through the air brake compressor to maintain cooling thereof during run operation and reduced parasitic power losses, said vanes guiding greater mass air flow to said blades at said brake position and said downstream segments of said blades to produce a high level of specific work on said greater mass air flow to produce a ratio of brake power loss when the vanes are in a brake position to parasitic power loss when the vanes are in a run position not less than eight-to-one.

3. In a vehicle having transmission means powered by a two-shaft gas turbine engine of the type including a gasifier compressor coupled on one end of a shaft having a gasifier turbine on the opposite end thereof and a power turbine connected to a second shaft having means thereon for transferring power from the power turbine shaft to the vehicle transmission and wherein the gasifier compressor supplies compressed air to a combustor assembly having a throttle controlled fuel supply, and wherein the combustion products from the combustor assembly pass through the gasifier turbine and the power turbine for driving the vehicle, the improvement comprising: a rear bulkhead on the engine, a portion of the power shaft extending axially through said rear bulkhead, an air brake compressor mounted directly on the power turbine shaft portion, said air brake compressor having an inlet and an outlet, said air brake including an impeller with a hub having an axial inlet and a radially outwardly curved surface extending from said inlet to the radially outer periphery of said impeller, a plurality of blades on said impeller each secured to said curved surface, each of said blades having an inlet edge, each of said blades having a downstream segment curved continuously from said inlet edge forwardly in the direction of impeller rotation and extending to the outer periphery of said impeller, said downstream segment having a forward curvature at the outer periphery of said impeller in excess of sixty degrees from a plane through the center of the impeller, inlet guide vanes in the inlet to said air brake compressor to control inlet mass air flow to the compressor, said vanes having an open brake position and a partially closed run position, means for positioning said vanes in the open brake position in response to deceleration movement of the throttle and in the partially closed run position in response to acceleration and vehicle speed maintenance positions of the throttle, said vanes throttling the inlet air flow to the air brake compressor in the run position to cause limited air flow through the air brake compressor to maintain cooling thereof during run operation and reduced parasitic power losses, said vanes guiding greater mass air flow to said blades at said brake position and said downstream segments of said blades to produce a high level of specific work on said greater mass air flow to produce a ratio of brake power loss when the vanes are in a brake position to parasitic power loss when the vanes are in a run position not less than eight-to-one.

4. In a two-shaft gas turbine engine of the type including a gasifier compressor coupled on one end of a shaft having a gasifier turbine on the opposite end thereof and a power turbine connected to a second shaft having means thereon for transferring power from the power turbine shaft to the vehicle transmission and wherein the gasifier compressor supplies compressed air to a combustor assembly which discharges combustion products through the gasifier turbine and the power turbine, the improvement comprising: a rear bulkhead on the engine, a portion of the power shaft extending axially through said rear bulkhead, an air brake compressor mounted directly on the power turbine shaft portion, said air brake compressor having an inlet and an outlet, said air brake including an impeller with a hub having an axial inlet and a radially outwardly curved surface extending from said inlet to the radially outer periphery of said impeller, a plurality of blades on said impeller secured to said curved surface, each of said blades having an inlet edge, each of said blades having a downstream segment curved continuously from said inlet edge forwardly in the direction of impeller rotation and extending to the outer periphery of said impeller, said downstream segment having a forward curvature at the outer periphery of said impeller in excess of 60° from a plane through the center of the impeller, inlet guide vanes in the inlet to said air brake compressor to control inlet mass air flow to the compressor, said vanes having an open brake position and a partially closed run position, said vanes throttling the inlet air flow to the air compressor in the run position to cause limited air flow through the air brake compressor to maintain cooling thereof during run operation and reduced parasitic power losses, said vanes guiding greater mass air flow to said blades at said brake position and said downstream segments of said blades to produce a high level of specific work on said greater mass air flow to produce a ratio of brake power loss when the vanes are in a brake position to parasitic power loss when the vanes are in a run position not less than eight-to-one.

* * * * *

UNITED STATES PATENT OFFICE
CERTIFICATE OF CORRECTION

Patent No. 4,003,199          Dated    January 18, 1977

Inventor(s) Albert H. Bell, III et al.

It is certified that error appears in the above-identified patent and that said Letters Patent are hereby corrected as shown below:

Title Page, Item [73] should read --- Assignees:
    said Bell assor to General Motors Corporation, Detroit, Mich. and said Egli assor to The Garrett Corporation, ----.

*Signed and Sealed this*

*fifth* Day of *July 1977*

[SEAL]

*Attest:*

RUTH C. MASON
*Attesting Officer*

C. MARSHALL DANN
*Commissioner of Patents and Trademarks*